Jan. 3, 1961

C. H. RUFER 2,966,911

CASTRATOR AND DOCKING DEVICE

Filed Oct. 30, 1957

INVENTOR.
Calvin H. Rufer
BY Sam J. Slotsky
ATTORNEY

United States Patent Office 2,966,911
Patented Jan. 3, 1961

2,966,911

CASTRATOR AND DOCKING DEVICE

Calvin H. Rufer, 414 Benson Bldg., Sioux Falls, S. Dak.

Filed Oct. 30, 1957, Ser. No. 693,403

2 Claims. (Cl. 128—306)

My invention relates to a castrator and docking device.

An object of my invention is to provide such a device which will quickly sever the spermatic cord without having the outer skin of the scrotum broken.

A further object of my invention is to provide a device of this character in which the angle that the tool is used is the most convenient for the operator, thereby providing ease of manipulation.

A further object of my invention is to provide an arrangement having adjustable characteristics.

A further object of my invention is to provide a simplified arrangement which in use will reduce shock to the animal in that the operation can be quickly performed without too much preparation.

A further object of my invention is to provide an efficiently operating device which is light in weight, and which can be manufactured economically.

A further object of my invention is to provide a device which can be used for docking tails as well.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 2:
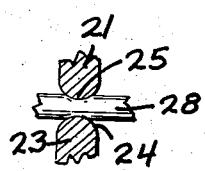
Figure 2 is an enlarged sectional view taken substantially along the lines 2—2 of Figure 1 and showing the arrangement as the spermatic cord is being severed.

My invention contemplates the provision of a castrating and docking device which includes features wherein the device will have a maximum leverage applied, thereby providing maximum pressures to quickly sever the spermatic cord of the animal, which, however, will not break the outer skin covering this cord.

I have used the character 10 to designate one of the handles of the tool to which is pinned or pivoted at 11 the bar 12 having the humped portion 13, the bar 12 being pivoted at 14 within the further hollow handle member 15 to which is attached at 16 the coiled spring 17, which spring is attached at 18 to the movable member 19 which is pivoted at 20 within the upper portion of the hollow handle 15, the handle 15 terminating in a solid upper jaw portion 21 having the integral extending end lug 22.

The portion 19 also terminates in a jaw portion 23, the jaw portion 23 terminating in the rounded or arcuate portion 24, which is adapted to close toward or against a similar round portion 25, which is a continuation of the jaw portion 21, and extending from the jaw portion 23 is a further integral lug 26 which is adapted to fall within the recess 27 when the jaws are closed, the recess 27 being part of the portion 21.

The operation of the device is as follows. The character 28 indicates the skin of that portion of the animal in which is located the spermatic cord, which is the cord to be severed by the tool. The jaws 21 and 23 are opened as shown in the dotted structure of Figure 1, and the tool is placed so that the cord will be received between the rounded portions 24 and 25, and then the handle 10 is pressed toward the handle 15, and due to the considerable leverages exerted by virtue of the differences in the fulcrum lengths, a very great pressure will be exerted by the jaws, and the cord will be instantly severed, and without breaking the skin, after which the testicles of the animal will atrophy in the usual manner.

The lugs 22 and 26 act as stops to prevent the spermatic cord from slipping out of the tool at any time during the operation, and the cord itself is cut by means of the extremely great pressure applied thereagainst.

Figure 3:
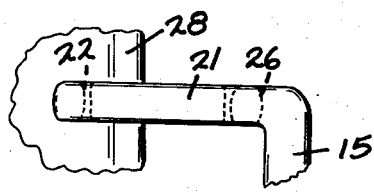
Figure 3 is a slight modification.
Figure 1:
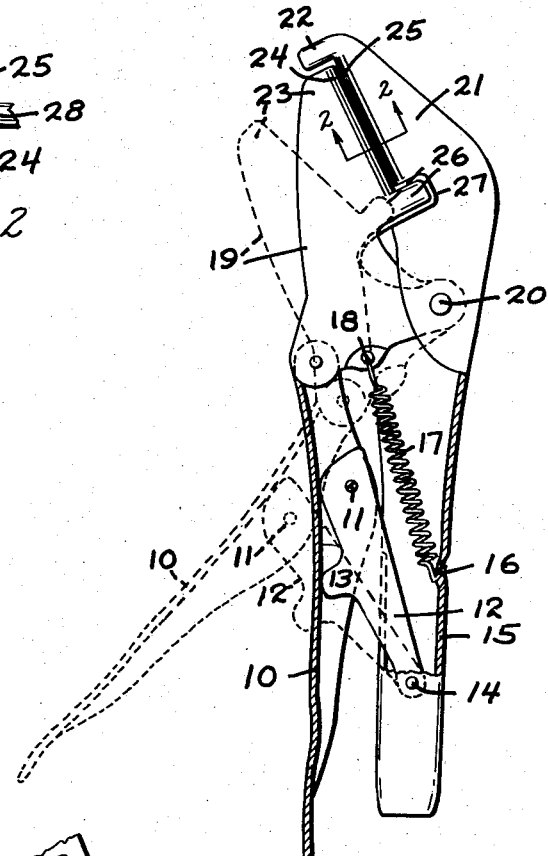
Figure 1 is a side elevation of the device.

Figure 3 illustrates a further modification wherein the tool is substantially identical to that shown in Figure 1 with the exception that the jaw portions 21 and 23 are bent over to a position substantially at right angles to the handles 10 and 15, it being noted that the same high pressure will be exerted in this instance also.

Figure 4:
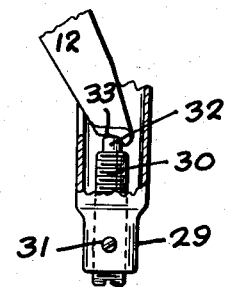
Figure 4 is a detail of the adjustable type of arrangement.

Figure 4 illustrates a still further modification in which the handle 15 includes an end portion 29 threadably engaged with a stud 30 which is secured by means of a lock screw 31, the stud 30 having the terminating portion 32 bearing against the end 33 of the bar 12, this arrangement providing means for adjustably positioning the jaws to a greater or lesser open initial position..

It will be understood also that this tool can be used for tail docking purposes.

It will now be seen that I have provided the advantages mentioned in the objects of my invention with further advantages being apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A castrating and docking device comprising a handle member having a fixed jaw, a movable jaw pivotally attached to said handle member, an operating handle pivotally connected to said movable jaw, said fixed jaw and said movable jaw including arcuate edges adapted to bear against a spermatic cord, a bar pivotally attached to said operating handle, said handle member including a threaded stud engaged with the lower terminal thereof, the end of said threaded stud bearing against the end of said bar for adjustably positioning the initial open position of said jaws, said jaws including end lugs for preventing slipping of a spermatic cord out of said jaws.

2. A castrator and docking device comprising a handle member having a fixed jaw portion, a movable jaw portion pivotally attached to said handle member, an operating handle pivotally connected to said movable jaw portion, a bar pivotally secured to said operating handle and to said handle member, further jaw portions being positioned generally at right angles to said fixed jaw portion and said movable jaw portion and extending integrally therefrom, said further jaw portions including arcuate edges adapted to bear against a spermatic cord.

References Cited in the file of this patent

UNITED STATES PATENTS

| 1,993,546 | Hart et al. | Mar. 5, 1935 |
| 2,476,895 | Muter | July 19, 1949 |
| 2,685,218 | Burns | Aug. 3, 1954 |